No. 624,106. Patented May 2, 1899.
R. H. SATTERLEE.
OPHTHALMOMETER.
(Application filed Mar. 23, 1897.)
(No Model.)
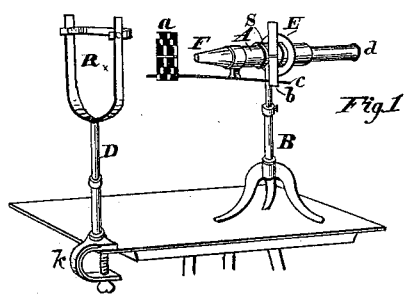
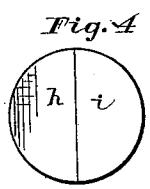
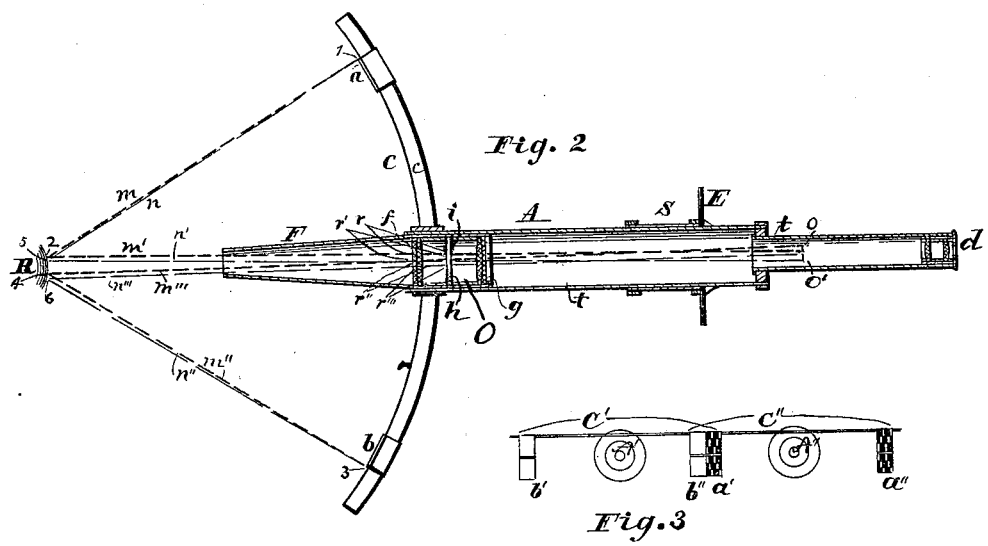
Witnesses
F. M. Chandler
Chas. A. Cunningham
Inventor
Richard H. Satterlee

UNITED STATES PATENT OFFICE.

RICHARD H. SATTERLEE, OF BUFFALO, NEW YORK.

OPHTHALMOMETER.

SPECIFICATION forming part of Letters Patent No. 624,106, dated May 2, 1899.

Application filed March 23, 1897. Serial No. 628,870. (No model.)

*To all whom it may concern:*

Be it known that I, RICHARD HENRY SATTERLEE, a citizen of the United States, residing at Buffalo, in the county of Erie and State of New York, have invented certain new and useful Improvements in Ophthalmometers, of which the following is a specification.

This invention relates to improvements in ophthalmometers, such as are used for measuring variations in curves of the cornea; and the objects of my improvements are, first, to provide a more simple, inexpensive, and serviceable objective in the telescope, and, second, to afford a means for attaching the head-rest to a table-top.

To these ends my invention consists in the mechanisms illustrated in the accompanying drawings, in which—

Figure 1 is a perspective view showing the telescope and head-rest in proper relative position for use. Fig. 2 represents a mid-horizontal section of the telescope and top view of the object, showing also the position of the eye placed for examination. Fig. 3 represents in outline the apparent images of the object seen in the telescope. Fig. 4 represents a face view, and Fig. 5 a top view, of the prisms as they are placed in the objective of the telescope.

Similar letters and numerals of reference refer to similar parts throughout the several views.

My improved ophthalmometer is composed of a twin-image-producing refracting achromatic telescope A, tripod B, containing sleeve S, degree-scale E, object C, and head-rest D.

F refers to accessory removable condenser.

Head-rest D is composed of an upright stem terminating at top with a forehead and chin support and at the base provided with a screw-clamp $k$ for attaching to a table-top. Object C is composed of an arc $c$ and mires $b$ and $a$. The arc is attached to the under side of the telescope at front end and curves forward. It projects equally, preferably, to right and left of the telescope. Mires $a$ and $b$ are movably attached to arc $c$. Sleeve S, hinged to the top of tripod B, serves to hold the telescope, the latter revoluble on its axis therein. A degree-scale on the rear face of disk E serves to indicate the meridian on which the examination is made. The telescope is composed of tube $t$, ocular $d$, and objective O. Objective O is composed of two plano-convex lenses $f$ $g$ and two equal triangular geometric prisms $h$ $i$. As in passing through a prism the course of a ray of light is changed it will be understood that rays of light from object C, which pass through prisms $h$ and $i$, so diverge that they are separately focused. Rays from points 1 3 of object meet the eye at points 2 4 and reflected in nearly parallel lines meet lens $f$ and prism $i$ at $r$ $r'$, the first going in a path represented by lines $m$ $m'$ and the second by the path indicated by lines $m''$ $m'''$, and thus to a focus at $o$. So, too, of the rays proceeding in lines $n$ $n'$ and $n''$ $n'''$ from points 1 3 reflected at 5 6, meet lens $f$ and prism $h$ at $r''$ $r'''$ are focused at $o'$. If the two prisms $h$ $i$ are properly constructed, the angle of the prisms is such that with their proper adjustment of mires $a$ $b$, one to another, and the distance from the eye at R then will appear at the focus of the objective two images, one overlapping the other, substantially as represented in Fig. 3.

As the mode of using my ophthalmoscope is the same as that of the "Javal," a further detailed description is deemed unnecessary.

I am aware that the employment of prisms, singly and in multiple, in optometers and otherwise, whereby as many images of the object as there are prisms in the instrumentality are produced on the retina of the eye looking through them, is old, as is instanced in Patents No. 349,385, dated September 21, 1886, and No. 534,375, dated February 19, 1895. I therefore make no broad claim to such instrumentalities.

I am aware also that in ophthalmometers the employment of a polarizing-prism which serves to divide a single set of rays of light from an object, so that the parts may be separately focused by the associated object-glass in the telescope, thereby producing two images, is old. I therefore make no claim to such combination.

What I do claim, and desire to secure by Letters Patent, is—

1. In an ophthalmometer, constructed substantially as herein described, the combination, in the telescope, of a pair of achromatic lenses and interposed pair of triangular geometric prisms, substantially as set forth.

2. The combination, in an ophthalmometer, of a telescope in which the objective is composed of a pair of achromatic lenses and a pair of interposed triangular geometric prisms, an object attached to the telescope composed of an arc and two mires adjustable on the arc, and a head-rest, substantially as set forth.

RICHARD H. SATTERLEE.

Witnesses:
  WM. JOHNSON,
  FRANK M. CHANDLER.